(12) United States Patent
Kim et al.

(10) Patent No.: US 11,212,360 B2
(45) Date of Patent: Dec. 28, 2021

(54) METHOD AND APPARATUS FOR MANAGING INFORMATION RELATED TO EDGE COMPUTING SERVICE

(71) Applicant: Samsung Electronics Co., Ltd., Suwon-si (KR)

(72) Inventors: Hyesung Kim, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/302,579

(22) Filed: May 6, 2021

(65) Prior Publication Data
US 2021/0352156 A1 Nov. 11, 2021

(30) Foreign Application Priority Data
May 8, 2020 (KR) .................. 10-2020-0055493

(51) Int. Cl.
| | |
|---|---|
| *G06F 15/167* | (2006.01) |
| *H04L 29/08* | (2006.01) |
| *H04W 4/50* | (2018.01) |
| *H04L 12/841* | (2013.01) |
| *H04W 8/24* | (2009.01) |

(52) U.S. Cl.
CPC ........ *H04L 67/2842* (2013.01); *H04L 47/286* (2013.01); *H04L 67/16* (2013.01); *H04L 67/32* (2013.01); *H04W 4/50* (2018.02); *H04W 8/24* (2013.01)

(58) Field of Classification Search
CPC ... H04L 67/2842; H04L 47/286; H04L 67/16; H04L 67/32; H04W 4/50; H04W 8/24

USPC ........................................................ 709/213
See application file for complete search history.

(56) References Cited

U.S. PATENT DOCUMENTS

| | | | | |
|---|---|---|---|---|
| 2009/0116404 | A1* | 5/2009 | Mahop .................... | H04L 41/12 370/254 |
| 2010/0294835 | A1* | 11/2010 | Bam ......................... | G07F 7/08 235/382 |
| 2013/0166712 | A1* | 6/2013 | Chandramouli ........ | H04L 67/10 709/223 |

(Continued)

OTHER PUBLICATIONS

3GPP TS 23.558 V0.2.0 (Apr. 2020), Technical Specification, 3rd Generation Partnership Project; Technical Specification Group Services and System Aspects; Architecture for enabling Edge Applications; (Release 17), Apr. 2020, 55 pages.

(Continued)

*Primary Examiner* — Atta Khan

(57) ABSTRACT

A method for continuously providing an edge computing service to user equipment (UE) by an edge enabler server (EES) of a mobile edge computing (MEC) system is provided, which includes receiving, from a source edge application server (EAS), update information including UE information and source EAS information, wherein the source EAS provides the edge computing service to the UE; retrieving, from an edge configuration server (ECS), target EES information based on the update information; transmitting, to a target EES, the UE information and the EAS information based on the target EES information; receiving, from the target EES, target EAS information; and transferring, to the source EAS, the target EAS information.

13 Claims, 10 Drawing Sheets

(56) References Cited

U.S. PATENT DOCUMENTS

2014/0040300 A1* 2/2014 Narayanan .......... G06F 3/04842
707/758
2018/0270720 A1 9/2018 Shi et al.
2019/0191341 A1 6/2019 Trang et al.

OTHER PUBLICATIONS

International Search Report of the International Searching Authority dated Sep. 3, 2021, in connection with International Application No. PCT/KR2021/005687, 5 pages.
3GPP TR 23.758 V17.0.0 (Dec. 2019), Technical Report, 3rd Generation Partnership Project; Technical Specification Group Services and System Aspects; Study on application architecture for enabling Edge Applications; (Release 17), Dec. 2019, 113 pages.
Huawei et al., "Discovery of Edge Application Server based on AF Influence in Support of Edge Relocation," S2-2000653 (revision of S2-xxxxx), 3GPP TSG-SA WG2 Meeting #136-AH, Incheon, South Korea, Jan. 13-17, 2020, 4 pages.

* cited by examiner

METHOD AND APPARATUS FOR MANAGING INFORMATION RELATED TO EDGE COMPUTING SERVICE

CROSS-REFERENCE TO RELATED APPLICATION

This application is based on and claims priority under 35 U.S.C. § 119 to Korean Patent Application No. 10-2020-0055493, filed on May 8, 2020, in the Korean Intellectual Property Office, the disclosure of which is herein incorporated by reference in its entirety.

BACKGROUND

1. Field

The disclosure relates to a method and an apparatus for managing service information, and particularly, to a method and an apparatus for managing information related to an edge computing service.

2. Description of Related Art

To meet the demand for wireless data traffic having increased since development of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, an edge computing system has recently appeared. The edge computing system enables user equipment (UE) to be provided with an edge computing service through establishment of a data connection with an edge data network that is located close to the location of the UE itself in order to use a low-latency or broadband service. Such an edge computing service may provide the service through an edge hosting environment being operated in an edge enabler server of a specific edge data network or an application server being driven in an edge computing platform. That is, the UE may be provided with the edge computing service from an edge application server most adjacent to an area where the UE itself is located.

In case that the UE, having been provided with the edge computing service in a specific area, intends to be provided with the edge computing service again in the same area in a state where the edge computing service is stopped, the UE may newly perform a procedure for being provided with the edge computing service.

SUMMARY

Accordingly, in case of reusing the edge computing service, the UE may repeat operations of retrieving edge computing configuration information and retrieving edge application server address information. Since this requires repetition of the same procedure, signaling overhead in accordance with the procedure is increased, and a significant delay occurs until the service starts.

Accordingly, the disclosure provides an apparatus and a method capable of reducing signaling overhead in case that a UE performs repeated on/off operations of an edge computing service.

Further, the disclosure provides a method and an apparatus for reducing a service delay in case that repeated on/off operations of an edge computing service occurred in a UE.

Further, the disclosure provides a method and an apparatus for providing edge computing service information to a UE.

According to one embodiment of the disclosure, a method for continuously providing an edge computing service to user equipment (UE) by an edge enabler server (EES) of a mobile edge computing (MEC) system may include: receiving, from a source edge application server (EAS), update information including UE information and source EAS information, wherein the source EAS provides the edge computing service to the UE; retrieving, from an edge configuration server (ECS), target EES information based on the update information; transmitting, to a target EES, the UE information and the EAS information based on the target EES information; receiving, from the target EES, target EAS information; and transferring, to the source EAS, the target EAS information, wherein the UE information includes a UE identifier and at least one of UE location information or target data network access identifier (DNAI), wherein the EAS information includes an EAS identification information and an EAS discovery filter including an EAS profile, and wherein the target EAS is triggered to be instantiated by the target EES.

According to another embodiment of the disclosure, a method for continuously providing an edge computing service to user equipment (UE) of a mobile edge computing (MEC) system may include: transmitting, to an edge enabler server (EES), a dynamic information subscribe request of an edge application server (EAS) providing the edge computing service; receiving, from the EES, a dynamic information subscribe request response; receiving, from the EES, a dynamic information notification message of the EAS; and caching information of the received message and updating and invalidating previously cached information, wherein the dynamic information subscribe request includes UE info, an App client ID, and information on the EAS.

According to yet another embodiment, an apparatus for continuously providing an edge computing service to user equipment (UE) of a mobile edge computing (MEC) system may include: memory; a processor; and a transceiver operably connected to the memory and the processor, the transceiver configured to: receive, from a source edge application server (EAS), update information including UE information and source EAS information, wherein the source EAS provides the edge computing service to the UE, retrieve, from an edge configuration server (ECS), target EES information based on the update information, transmit, to a target EES, the UE information and the EAS information based on the target EES information, receive, from the target EES, target EAS information; and transfer, to the source EAS, the target EAS information, wherein the UE information includes a UE identifier and at least one of UE location information or a target data network access identifier (DNAI), wherein the EAS information includes EAS identification information and EAS discovery filter information including an EAS profile, and wherein a target EAS is triggered to be instantiated by the target EES.

According to the apparatus and the method according to the disclosure, the service start delay time and signaling can be reduced by preventing or minimizing repeated performing of service provisioning and edge application server (EAS) discovery request operations when the UE reuses the edge computing service. Further, a continuous service can be guaranteed and the signaling can be reduced by transferring information related to the edge computing service to the UE so as to update the information in the UE in accordance with the state change of the edge computing server.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the disclosure will be more apparent from the following detailed description, taken in conjunction with the accompanying drawings, in which.

DETAILED DESCRIPTION

Figure 1:
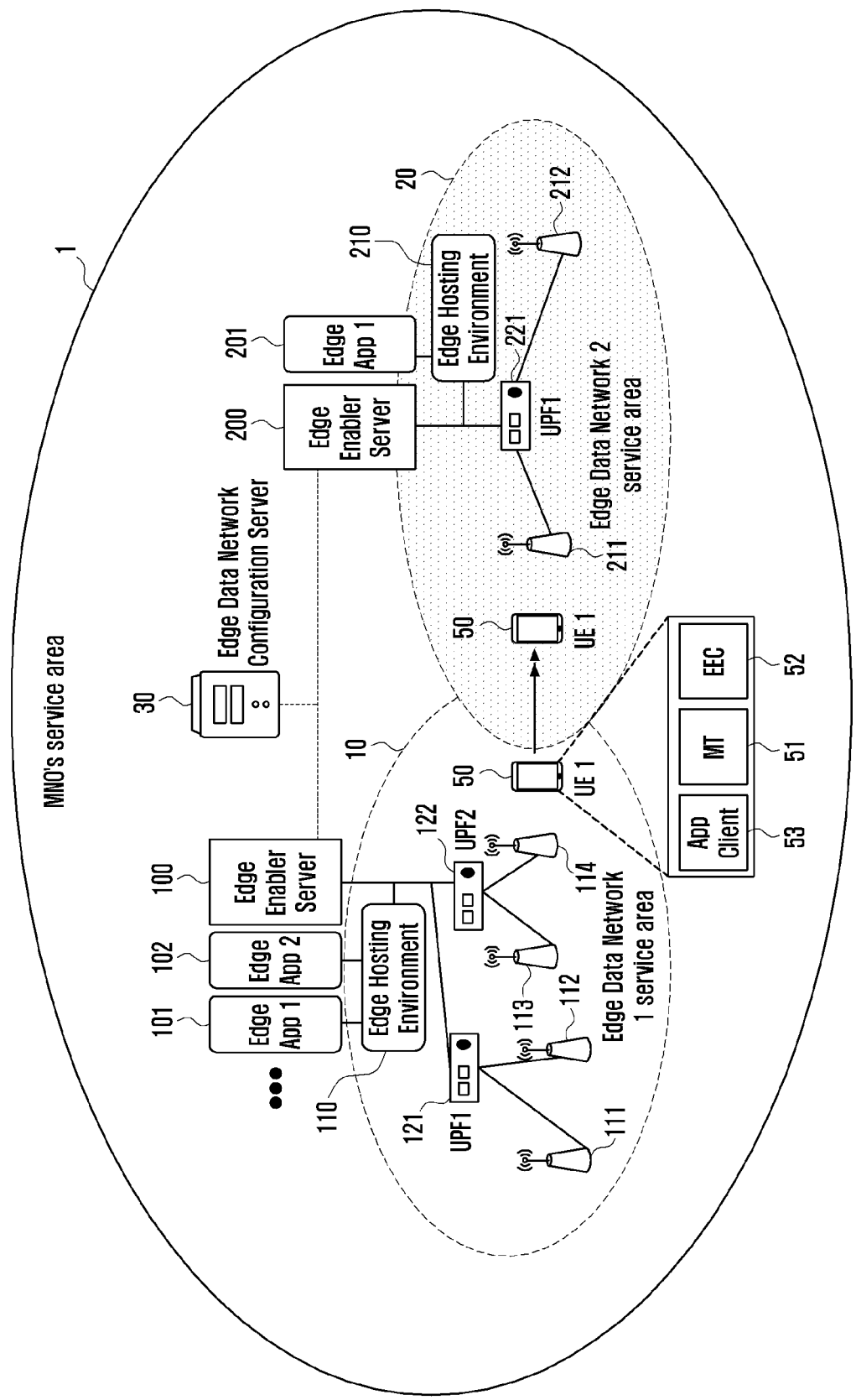
FIG. 1 illustrates an example of an edge computing implementation scenario to which the disclosure is applicable.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be described in detail with reference to the accompanying drawings. Furthermore, terms to be described hereunder have been defined in consideration of functions in the disclosure, and may be different depending on a user, an operator's intention, or practice. Accordingly, such definition should be determined based on the contents over the entire specification.

The terms referring to network entities and entities of an edge computing system, terms referring to messages, and terms referring to identification information, which are used in the disclosure, have been exemplified for convenience in explanation. Accordingly, the disclosure is not limited to the terms to be described later, and other terms referring to objects having equivalent technical meanings may be used.

Hereinafter, for convenience in explanation, terms and names defined in the 5G system standards are used in the disclosure. However, the disclosure is not limited by the above terms and names, and may be equally applied to systems complying with other standards.

The disclosure to be described hereinafter relates to a communication system. In the disclosure, UE may establish a data connection with an edge data network that is located close to the location of the UE itself in order to use a low-latency or broadband service. Further, the UE may access an edge hosting environment being operated in an edge enabler server of the corresponding edge data network or an edge application server being driven in an edge computing platform. Hereinafter, technology about a mobile edge computing (MEC) in which UE performing such an operation uses a data service will be described.

Further, in the disclosure to be described hereinafter, a technology to provide a method and an apparatus for updating information related to an edge computing system in a UE will be described. A method and an apparatus for transferring information necessary to use an edge computing service through configuration of a time to live/storage period in case of transferring the information to the UE will be described. Further, a method and an apparatus for providing related information to a UE in case that a situation causing a change of whether the information related to the edge computing service is effective and reusable occurs, and a system necessary therefor will be described. Such a situation may occur in accordance with the positional distributed arrangement characteristics of an edge computing server and mobility of the UE.

According to the disclosure to be described hereinafter, in case that the UE reuses the edge computing service, it is possible to prevent and/or minimize repeated performing of operations for retrieving edge computing configuration information and for retrieving edge application server address information. Through this, the service start delay time and signaling overhead can be reduced. Further, explanation will be made with respect to an operation and an apparatus for informing the UE using the edge computing service of whether information on servers related to the edge computing service previously connected is effective and reusable when an application is re-executed.

Specifically, explanation will be made with respect to a technology to cache edge computing configuration information (edge configuration data, e.g., edge enabler server address/service area/status) and/or edge application server information (e.g., edge application server address/service area/status/service KPI) in UE when an application is re-executed, and to provide criteria for determining whether the cached information is effective/reusable. Further, schemes to minimize signaling of a UE for re-retrieving UE edge computing configuration information and/or edge application information when the information update occurs will be described.

FIG. 1 illustrates an example of an edge computing implementation scenario to which the disclosure is applicable.

FIG. 1 shows an example of a service area 1 of a mobile network operator. In the service area 1 of the mobile network operator, edge data networks 10 and 20 divided to provide an edge computing service to a UE, for example, an electronic device 50, may be included. Hereinafter, explanation will be made on the assumption that the electronic device 50 is a specific example of the UE.

The electronic device 50 may include a smart phone, a smart watch, smart glasses, a tablet computer, a notebook computer, a personal computer, or an IoT device. Further, the electronic device 50 may be a specific device mounted on transportation, such as a bicycle, a motorcycle, a vehicle, a boat, a ship, an aircraft, or a drone. Accordingly, in the following description, the UE or the electronic device 50 may be understood as the same meaning. Further, the electronic device 50 according to the disclosure may be mounted with at least one edge computing service app client 53, may include an edge enabler client (EEC) 52 according to the disclosure, and may include a mobile terminal (MT) 51 that performs a wireless communication function, for example, a communication layer. The MT 51 may include an antenna, a wireless circuit, a modem, or at least one communication processor so as to communicate with a wireless communication system including a mobile communication system.

Although not exemplified in FIG. 1, the electronic device 50 may include at least one processor for an overall control of the electronic device 50. Further, the electronic device 50 may be mounted with an edge computing service app. Mounting of the edge computing service app (app client) may mean installation (or storage) of the app for being provided with the edge computing service in a memory (not illustrated in the drawing) of the electronic device 50. Further, mounting of the edge computing service app (app client) may mean loading of the app installed in the electronic device 50 onto at least one processor so as to perform an operation for providing the edge computing service.

The edge enabler client 52 may be installed in the memory (not illustrated in the drawing) of the electronic device 50 mounted with the app for being provided with the edge computing service. Further, the edge enabler client 52 may mean that it is loaded onto at least one processor on behalf of the installed app so as to perform at least a part of an operation necessary in the edge computing service app.

The edge data networks 10 and 20 exemplified in FIG. 1 may have areas for providing the edge computing service to the electronic device 50. For example, FIG. 1 exemplifies a case that a first base station 111, a second base station 112, a third base station 113, and a fourth base station 114 are included in a service area 10 of a first edge data network, and a fifth base station 211 and a sixth base station 212 are included in a service area 20 of a second edge data network. Here, the respective base stations 111, 112, 113, 114, 211, and 212 may be base stations of the mobile communication system, for example, a wireless communication system having specific wireless service areas, such as an LTE system, an LTE-A system, an NR system, a WiFi system, and/or a Wibro system. As described above, in an example of FIG. 1, an NR system that is a 5G system will be described.

In the example of FIG. 1, it is exemplified that two different user plane function (UPF) devices 121 and 122 are included in the service area 10 of the first edge data network including the first base station 111 to the fourth base station 114. Further, it is exemplified that only one user plane function 221 is provided in the service area 20 of the second edge data network. Here, the UPF devices may be implemented as one specific instance. One instance may be driven in one specific server, or may be driven in two or more servers. Further, two or more instances may be driven in one specific server. In the disclosure, restrictions are not placed on such matters.

Meanwhile, as can be known from the example of FIG. 1, the edge data network may have one or more UPFs. The service area 10 of the first edge data network may be an area configured by one edge enabler server 100. Further, the service area 20 of the second edge data network may be an area configured by another edge enabler server 200. As described above, the service areas 10 and 20 of the edge data networks may be configured as areas that can be managed by the edge enabler servers 100 and 200.

As exemplified in FIG. 1, the edge enabler servers 100 and 200 may be connected with or may include edge app servers 101, 102, and 201 that provide the same or different edge computing services. The first edge app servers 101 and 201 and the second edge app server 102 may provide different edge computing services. The first app server 201, which is located in the service area 20 of the second edge data network and provides the same service as the service of the first edge app server 101 located in the service area 10 of the first edge data network, may provide the edge computing service to the electronic device 50 through the different edge enabler servers 100 and 200. As exemplified in FIG. 1, the first edge app server 101 located in the service area 10 of the first edge data network may provide the edge computing service to the electronic device 50 connected with any one of the base stations 111, 112, 113, and 114 located in the first edge data network. The second edge app server 102 may provide the edge computing service to the electronic device 50 connected to any one of the base stations 111, 112, 113, and 114 located in the first edge data network.

The base stations 111, 112, 113, 114, 211, and 212 have predetermined areas which can perform communication with the user equipment 50 in a wireless communication system configured with the user equipment 50. For example, in case that the configured wireless communication system is a 3GPP mobile communication system, the base stations 111, 112, 113, 114, 211, and 212 may become base stations of the 3GPP mobile communication network.

The user plane functions (UPFs) 121, 122, and 221 may serve as gateways transferring packets being transmitted and received by the user equipment 50. According to an embodiment of the disclosure, the UPFs 121, 122, and 221 may be located in places physically and/or logically close to the edge enabler servers 100 and 200 in order to support the edge computing service. By configuring the UPFs 121, 122, and 221 and the edge enabler servers 100 and 200 to be located physically and/or logically close to each other, it is possible to reduce transmissions by directly transferring data packets to be provided to the user equipment 50 (or being received from the user equipment 50) to the edge data network without passing through the Internet. That is, low-latency transmission becomes possible. According to another embodiment of the disclosure, the UPFs 121, 122, and 221 may be connected even with the data network connected with the edge enabler servers 100 and 200 through the Internet.

According to an embodiment of the disclosure, the edge computing system may be composed of edge enabler servers 100 and 200, an edge data network configuration server 30, and an edge enabler client (EEC) 52. According to various embodiments of the disclosure, the edge enabler servers 100 and 200 may establish edge hosting environments 110 and 210 or an edge computing platform. Establishment of the edge hosting environments 110 and 210 or the edge computing platform may mean a case where the edge enabler servers 100 and 200 and at least one edge app server 101, 102, and 201 are connected with each other, or at least one edge app server 101, 102, and 201 is driven in the edge hosting environment of the edge enabler servers 100 and 200 or on the edge computing platform. Accordingly, the edge enabler servers 100 and 200 can be aware of information about the edge app servers 101, 102, and 201 being driven in the edge hosting environment or being driven on the edge computing platform.

According to various embodiments of the disclosure, the edge enabler servers 100 and 200 may connect between the app client 53 being driven in the user equipment 50 and the edge app servers 101, 102, and 201 in the edge hosting environment through negotiation with the user equipment 50. According to various embodiments of the disclosure, the user equipment 50 that supports the edge computing system may be provided with the edge enabler client 52 built or mounted therein as described above. According to an embodiment of the disclosure, the negotiation between the user equipment 50 and the edge application servers 101, 102, and 201 may proceed through interworking between the edge enabler client 52 in the user equipment 50 and the edge enabler servers 100 and 200. According to an embodiment of the disclosure, a layer on which the interworking between the edge enabler client 52 and the edge enabler servers 100 and 200 is performed may be called an edge enabling layer.

According to various embodiments of the disclosure, the edge data network configuration server 30 may be aware of deployment information of the edge enabler servers 100 and 200, and may perform a function for transferring configuration information to use the edge computing service to the user equipment 50. According to an embodiment of the disclosure, the configuration information may include at least one of edge data network connection information, edge data network service area, and edge enabler server connection information.

According to various embodiments of the disclosure, the edge data network connection information may include, for example, information, such as a data network name and single-network slice selection assistance information (S-NSSAI). According to various embodiments of the disclosure, the edge data network service area may include, for example, at least one of a cell list, a list of tracking area, or an operator's network identifier (PLMN ID). According to various embodiments of the disclosure, the edge enabler server connection information may be, for example, a uniform resource identifier (URI).

According to various embodiments of the disclosure, the user equipment 50 may receive accessible edge enabler server information from the edge data network configuration server 30 based on a specific location, for example, information on a specific base station, a specific data network, or a specific physical location. According to an embodiment of the disclosure, if the edge data network configuration server 30 can be aware of information about the edge application server being driven in the edge hosting environment of the specific edge enabler server, the user equipment 50 can also retrieve the corresponding information through the edge enabler client 52.

According to various embodiments of the disclosure, the edge application servers 101, 102, and 201 may mean third application servers being driven in the edge computing system. According to an embodiment of the disclosure, the edge application servers 101, 102, and 201 may be the third application servers being driven on an infrastructure being provided by the edge hosting environment, and may provide an ultralow-latency service since the edge application servers 101, 102, and 201 can provide the service in a location close to the user equipment 50. According to various embodiments of the disclosure, information about a higher layer of the service that the edge application server provides to the user equipment 50 may be called an application context. For example, when a user uses a real-time game app, a screen being viewed by the user in the current game and all pieces of information necessary to regenerate a play stage may be included in the application context. For example, in order for the user equipment 50 to be connected to another edge application server and to use the existing service seamlessly, the application context may be relocated in an edge application server to be newly connected. In order to perform the application context relocation, it is necessary that the edge application server capable of providing the service to the app being driven by the application client 53 of the user equipment 50 is in an available state. The availability of the edge application server in the edge data network may be determined depending on whether the edge application server is driven in the edge hosting environment and the state of the edge application server.

According to various embodiments of the disclosure, in the user equipment 50, as described above, the application client 53, the edge enabler client 52 that interlocks the edge computing service with the application client 53, and the mobile terminal (MT) 51 that accesses the mobile communication system may exist. According to various embodiments of the disclosure, the app of the user equipment 50 is an app being provided by a third party, and means a client application program being driven in the user equipment 50 for a specific application service. Two or more apps may be driven in the user equipment 50. According to an embodiment of the disclosure, at least one of such apps may use a multi-access edge computing (MEC) service. The edge enabler client 52 in the user equipment 50 may mean a client that performs an operation in the user equipment 50, which is necessary to use the edge computing service. According to an embodiment of the disclosure, the edge enabler client 52 may identify which application app can use the edge computing service, and may perform an operation for connecting a network interface so that data of the application client of the user equipment 50 can be transferred to the edge application server providing the edge computing service. According to an embodiment of the disclosure, the user equipment 50 may configure a radio channel with the base station through the mobile terminal 51 in order to use the edge computing service. The radio channel configuration may be performed by a communication layer of the mobile terminal 51, for example, 3GPP communication layer. According to an embodiment of the disclosure, the communication layer of the mobile terminal 51 may establish a wireless connection for data communication, register the user equipment 50 in the mobile communication system, establish a connection for data transmission in the mobile communication system, and perform data transmission and reception.

Figure 2:
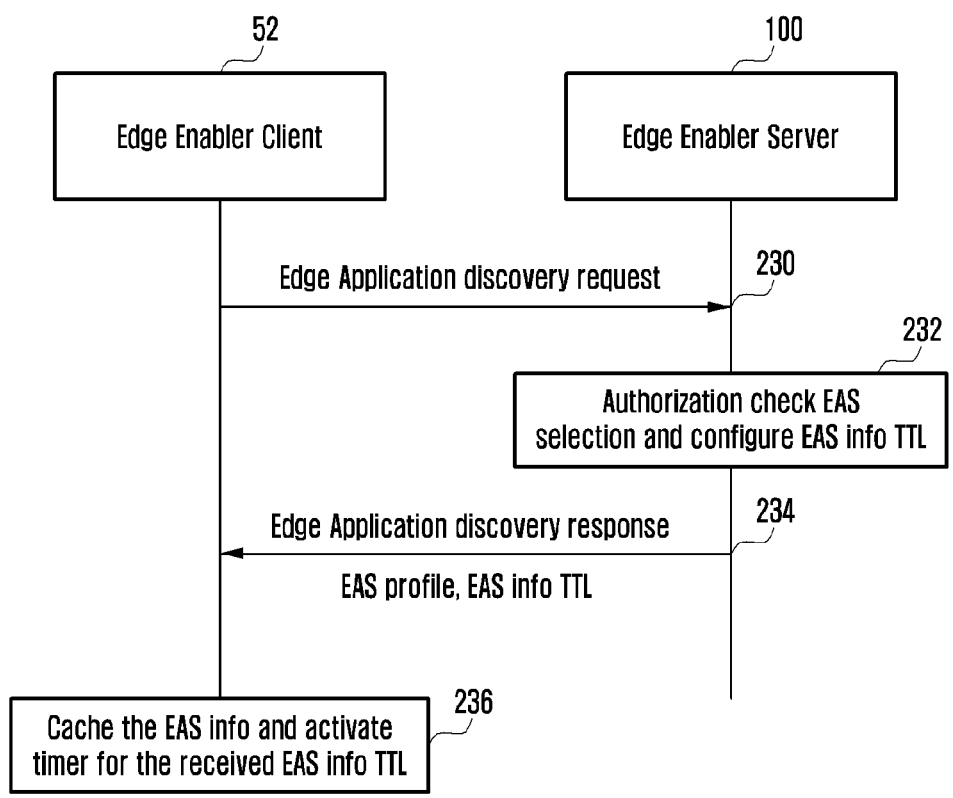
FIG. 2 illustrates a signal flowchart in case that an edge enabler server of a MEC system provides edge application information to user equipment according to various embodiments of the disclosure.

FIG. 2 illustrates a signal flowchart in case that an edge enabler server of a MEC system provides edge application information to a user equipment according to various embodiments of the disclosure.

Prior to the description with reference to FIG. 2, it is assumed that devices exemplified in FIG. 2 are the user equipment 50 and the edge enabler server 100 of FIG. 1 as described above, and the user equipment 50 is located within the service area 10 of edge data network 1 (or edge enabler service area) of the edge enabler server 100.

Referring to FIG. 2, at operation 230, the edge enabler client (EEC) 52 in the user equipment 50 may transmit an edge application server (EAS) discovery request message to the edge enabler server (EES) 100 in order to retrieve information about the edge application server that can provide a service to the application client 53 in the user equipment 50.

At operation 232, the EES 100 may select the edge application server (EAS) requested in the EAS discovery request message of the EEC 52, and at operation 234, the EES 100 may include EAS endpoint address information and EAS profile information excluding the address information, for example, information, such as an EAS service key performance indicator (KPI) and a service area, in an EAS discovery response message, and may transfer the EAS discovery response message to the EEC 52. The EES 100 is a time to live (TTL) period or a storage period of the information being transferred to the EEC 52, and EAS info time to live (TTL) (or lifetime) may be configured and transferred together. In case of configuring the EAS info TTL, the EES 100 may be configured based on an EAS service area, EAS time of operation, and EAS service KPI in the corresponding EAS profile. For example, in case that the user equipment 50 has mobility and the EAS service area is narrow, the EAS info TTL value may be configure to be smaller, and thus the update period of the EAS information may be taken to be faster. In another embodiment, the EAS info TTL may be determined as the EAS info TTL/storage period based on an EAS registration expiration time. The EAS registration expiration time may be a value that is transferred from the EES 100 to the EAS. Further, the EAS may perform a registration request with indication of EAS update with respect to the EES 100 before the EAS registration expiration time elapses. If the EAS does not perform the EAS registration before the expiration time elapses, the EES 100 may perform de-registration of the EAS, and may determine that the corresponding EAS is in an unavailable status.

At operation 234, when the EES 100 transfers the EAS info TTL to the user equipment 50, the EES 100 may map the EAS info TTL onto EAS information that is provided to the user equipment 50 through the EAS discovery response message. In another embodiment, the EES 100 may include the EAS info TTL in the EEC registration response message to be transferred. For example, in case that the EEC registration message is not for initial registration, but is for registration update, the EES 100 may include a new EAS info TTL value in the EEC registration response message to be transferred in order to update (extend) the EAS info TTL stored in the EEC 52 of the user equipment 50. The EEC 52 having received the new TTL value may extend the corresponding EAS info TTL period or storage period as large as the newly received TTL value. For example, the EEC 52 may initialize a timer for the EAS info TTL, and may apply the new TTL value while performing activation again.

At operation 236, the EEC 52 may cache the EAS information being provided through operation 234, and may configure the TTL period and the storage period based on the provided EAS info TTL. If the EES does not provide the EAS info TTL, the EEC 52 may determine the EAS info TTL value by optionally configuring the TTL/storage period for the EAS info received from the EES 100. For example, the EEC 52 may optionally configure the TTL/storage period for the EAS info by using a locally configured value or based on the mobility of the user equipment 50 and app client profile information available in the user equipment 50. In another embodiment, the EEC 52 may configure the EAS info TTL value with reference to the EAS profile and the app client profile being provided from the EES 100.

In the above-described embodiment, the EAS info TTL may be expressed as a temporal validity condition of the EAS info (e.g., a time interval or a timer duration during which the EAS info is valid) or an EAS info expiration time (or EAS info lifetime).

Figure 3A:
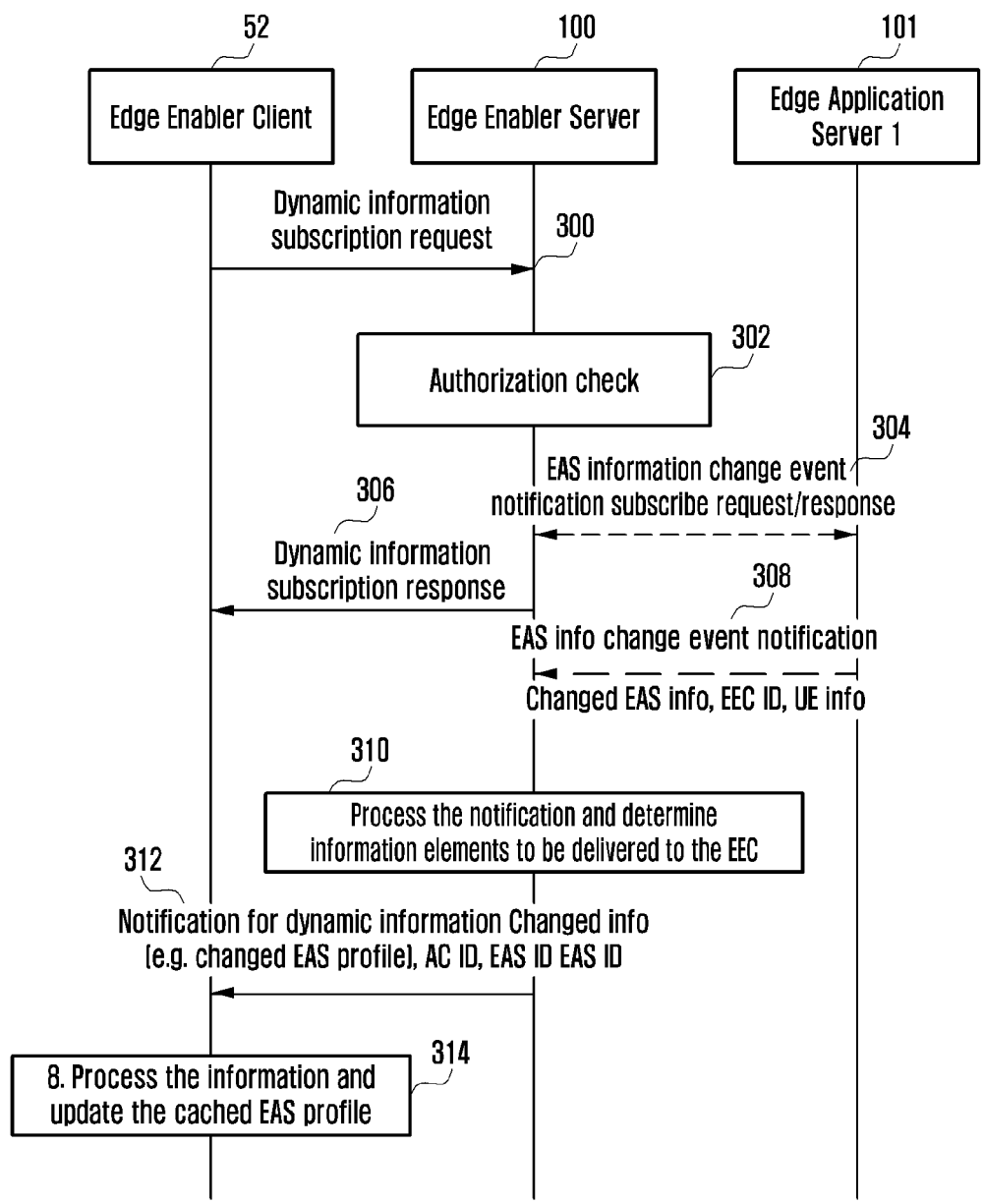
FIG. 3A illustrates a signal flowchart with a MEC network in case that an edge enabler client updates EAS information according to an embodiment of the disclosure.

FIG. 3A illustrates a signal flowchart with a MEC network in case that an edge enabler client updates EAS information according to an embodiment of the disclosure.

Prior to the description with reference to FIG. 3A, it is assumed that devices exemplified in FIG. 3A are the user equipment 50 and the edge enabler server 100 of FIG. 1 as described above, and the user equipment 50 is located within the service area 10 of edge data network 1 of the edge enabler server 100.

Referring to FIG. 3A, at operation 300, the edge enabler client (EEC) 52 may transmit, to the edge enabler server (EES) 100, a subscribe request (e.g., a dynamic information subscription request) message for receiving a notification of an information change of a specific edge application server (EAS). When transmitting the corresponding subscribe request (e.g., a dynamic information subscription request) to the EES 100, the EEC 52 may provide user equipment information (UE info), application client information (app client ID), a service through connection with the app client in the user equipment, and information on the EAS together. Here, the user equipment information (UE info) may include, for example, information, such as a user equipment identifier (UE ID), a user equipment IP address (UE IP address), a user equipment core network type (UE CN type), and user equipment core network capability (UE core network capability). Further, the information for the EAS may include, for example, EAS ID and address information. The provided EAS information, the UE information, and the app client information may be used for the EES 100 to select the EAS to be monitored and to select monitoring target information.

At operation 302, the EES 100 may perform an authentication procedure for the dynamic info subscription service of the EEC 52 and the UE based on the information at operation 300.

At operation 304, the EES 100 may identify whether an EAS information change event for the EAS (e.g., in the embodiment of FIG. 3A, the first edge application server 101) that provides the service to the EEC having requested the subscription or the UE 50 can be monitored, and may request a subscribe operation for an EAS information change event notification for monitoring. When being transmitted, the corresponding EAS information change event notification subscribe request message may include the UE ID of the requested user equipment, EEC ID, and app client ID.

In one embodiment, the EES 100 may not perform a separate subscribe operation, but may monitor the EAS information change through the EAS registration operation (e.g., the EES may provide an EAS registration expiration time to the EAS during an initial EAS registration operation so as to periodically perform the EAS registration with indication of update, and thus may perform monitoring through the EAS registration).

At operation 306, the EES 100 may transmit, to the EEC 52, a dynamic information subscribe response message including the result of the dynamic information subscribe request (e.g., success/failure) and monitoring target EAS information. Here, the EAS information may include, for example, an EAS status, EAS service area, EAS service KPI, and computing resource change. Further, the dynamic information subscribe response message may be allocated with a subscription ID capable of identifying the subscription for the corresponding user equipment, and the EEC ID or the UE ID and the monitoring target EAS information (e.g., an ID and an address) may be mapped and recorded. Thereafter, when transmitting the result of the dynamic information subscribe request, the EES may include the subscription ID and notification target EAS information in the dynamic information subscribe response message to be transferred (e.g., in case that monitoring of the target EAS is possible).

Meanwhile, when the EAS information update occurs, the EAS, at operation 308, transmits an EAS info change event notification message to the EES 100. The corresponding notification message to be transmitted may include the UE ID of the user equipment having been provided with the EAS service, the EEC ID, the app client ID, and updated information. Here, the updated information may include, for example, at least one of the EAS address update, service KPI update, and EAS profile information.

At operation 310, the EES 100 may determine notification transfer target user equipment based on the information included in the EAS info change event notification message of the EAS 101 at operation 308. If the EAS info change event includes that the EAS is in an unavailable status, the EES 100 may perform an additional operation for instantiation of the new EAS. Such an additional operation will be described in more detail in an embodiment of FIG. 4 to be described hereinafter. If information related to user equipment mobility (e.g., UE location changed or DNAI changed) is included in the EAS info change event, the EES 100 may perform an additional operation for retrieving accessible target EES and target EAS information in a location to which the user equipment has moved. This will be described in more detail with reference to FIG. 4 to be described later.

At operation 312, the EES 100 may transmit a notification for dynamic information message to the EEC 52, and the notification for dynamic information message may include EAS update information (e.g., EAS schedule in an EAS profile, service area, and service KPI) obtained at operation 308 and operation 310, a corresponding EAS identifier (ID), and a supported app client ID in a notification for dynamic information message. The EES 100 may include a new EAS info TTL for the information being transmitted in the message to be transferred to the EEC 52.

At operation 314, if the information being provided through operation 312 does not include unavailable/disabled EAS status and does not include even the new EAS address information (e.g., in case that the existing EAS is available, but only partial information is changed), the EEC 52 may update the EAS information being cached in a memory (not illustrated in the drawing) of the user equipment 50 to the provided EAS information, and may configure the TTL period and the storage period based on the provided EAS info TTL.

Figure 3B:
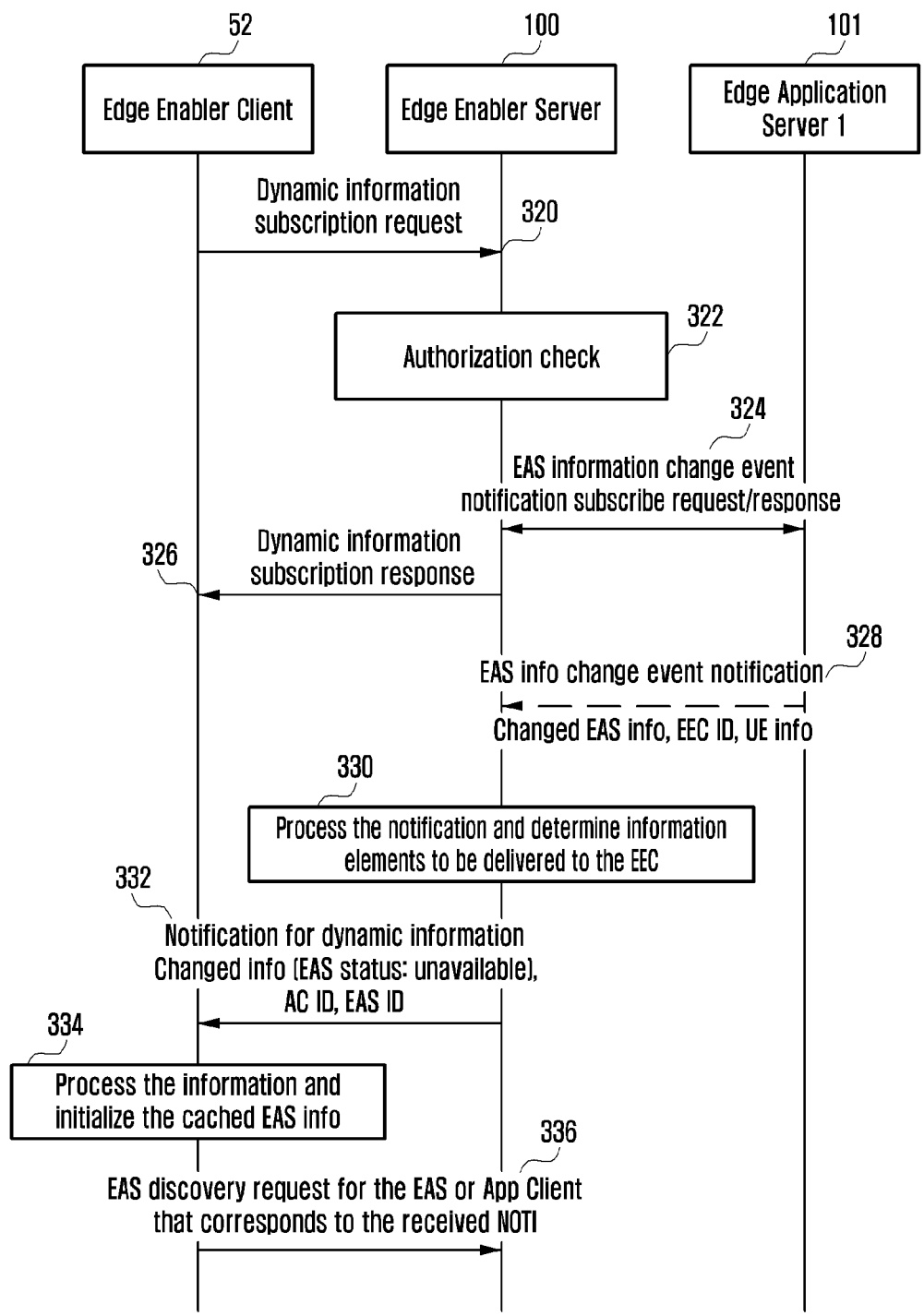
FIG. 3B illustrates a signal flowchart with a MEC network in case that user equipment performs discovery of an edge enabler server in a MEC system according to various embodiments of the disclosure.

FIG. 3B illustrates a signal flowchart with a MEC network in case that user equipment performs discovery of an edge enabler server in a MEC system according to various embodiments of the disclosure.

Prior to the description with reference to FIG. 3B, it is assumed that devices exemplified in FIG. 3B are the user equipment 50 and the edge enabler server 100 of FIG. 1 as described above, and the user equipment 50 is located within the service area 10 of edge data network 1 of the edge enabler server 100.

At operation 320, the EEC 52 may perform a subscribe operation for receiving a notification of an information change of a specific EAS from the EES 100. When transmitting the corresponding subscribe request (e.g., a dynamic information subscription request) message to the EES 100, the EEC 52 may include, in the message, and provide user equipment information (UE info: e.g., a UE ID, a UE IP address, a UE CN type, and UE core network capability), app client information (app client ID), and information (e.g., EAS ID and address information) on the EAS which is connected to the app client in the user equipment to provide a service. The provided EAS information, the UE information, and the app client information may be used for the EES 100 to select the EAS to be monitored and to select monitoring target information.

At operation 322, the EES 100 may perform an authentication procedure for the dynamic info subscription service of the EEC and the UE based on the information included in the message received at operation 320.

At operation 324, the EES 100 may identify whether an EAS information change event can be monitored for the EEC 52 having requested the subscribe or the EAS 101 providing the service to the UE 50, and may request a subscribe operation for an EAS information change event notification for monitoring. When the EES 100 transmits the EAS information change event notification subscribe request message to the EAS 101, the corresponding message may include the UE ID of the requested user equipment, EEC ID, and app client ID.

In one embodiment, the EES 100 may not perform a separate subscribe operation, but may monitor the EAS information change through the EAS registration operation (e.g., the EES 100 may provide an EAS registration expiration time to the EAS 101 during an initial EAS registration operation so as to periodically perform the EAS registration with indication of update, and thus can perform monitoring using the EAS registration message).

At operation 326, the EES 100 may transmit, to the EEC 52, a dynamic information subscribe response message including the result of the dynamic information subscribe request (e.g., success/failure) and monitoring target EAS information. In this case, the dynamic information subscribe response message may include a subscription ID and notification target EAS information to be transferred.

At operation 328, when the EAS information update occurs, the EAS (e.g., the first edge application server 101 of FIG. 1) may transmit an EAS info change event notification message to the EES 100. The corresponding notification message may include the UE ID of the user equipment having been provided with the service of the EAS, the EEC ID, the app client ID, and updated information (e.g., EAS address update, service KPI update, and EAS profile information).

At operation 330, the EES 100 may determine target user equipment to transmit the notification message based on the information in the EAS info change event notification message received from the EAS 101 at operation 328. Specifically, the EES 100 may select the user equipment receiving the service from the corresponding EAS 101 or having received the EAS information transferred from the EES 100, for example, the user equipment performing the EEC registration or EAS discovery with respect to the EES 100 and having received the corresponding EAS information provided through the response message. If the EAS info change event message includes that the EAS is in an unavailable status, and the EES 100 is unable to intervene in a new EAS instantiation operation, or another EAS that can provide the same service is also unavailable, only the changed EAS status can be transferred to the user equipment 50 at the next operation. If the EAS that can provide the same service is available, the EES 100 may retrieve and use information on the corresponding EAS (e.g., an ID and an address) when performing the next operation.

At operation 332, the EES 100 may include EAS status update information grasped at operation 328 and operation 330 in a notification for dynamic information message, and may transmit the message to the EEC 52. The EAS update information may include changes for an EAS schedule in an EAS profile, service area, service KPIs, and EAS status. Further, if another available EAS exists in the same platform or edge hosting environment at operation 330, the corresponding EAS ID and address information may also be included in the notification for dynamic information message.

At operation 334, if EAS status information is changed to unavailable or disabled, the EEC 52 may process the EAS status information, and may initialize the EAS information cached in the memory. Thereafter, unlike the embodiment of FIG. 3A, the EEC 52 may perform one of the following operations.

(i) In case that the EAS status provided at operation 332 is the unavailable status and new EAS address information is not included, the EEC 52, at operation 336, may perform an EAS discovery request or an application context relocation request with respect to the corresponding EAS ID or app client ID for which the corresponding EAS provides the service; or (ii) If the EAS address information is provided at operation 332, the EEC 52 may not perform the EAS discovery request, but may cache the EAS address information provided at operation 336 for the EAS info TTL or EAS lifetime, and may route data traffic occurring in the app client 53 to the cached EAS address. Further, the EEC 52 may perform the EEC registration request (including registration update indication) including the updated EAS address, and may route the data traffic occurring in the app client 53 to the provided EAS address.

Figure 4:
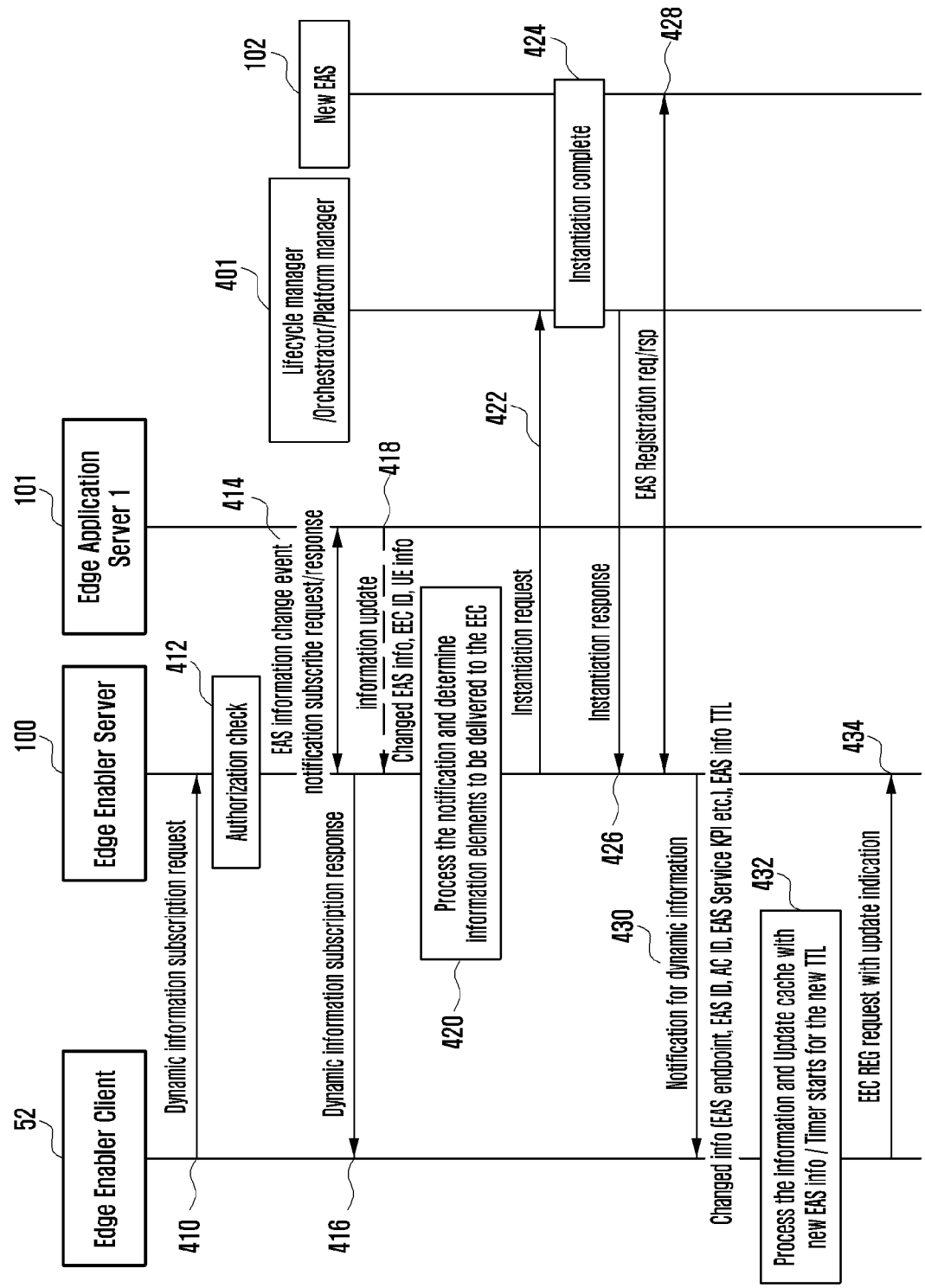
FIG. 4 illustrates a signal flowchart with a MEC network in case of updating new EAS information according to various embodiments of the disclosure.

FIG. 4 illustrates a signal flowchart with a MEC network in case of updating new EAS information according to various embodiments of the disclosure.

Prior to the description with reference to FIG. 4, it is assumed that in the devices exemplified in FIG. 4, and the user equipment 50 of FIG. 1 as described above is initially connected to the edge enabler server 100 and is located within the service area 10 of edge data network 1 of the edge enabler server 100.

Referring to FIG. 4, at operation 410, the EEC 52 may perform a subscribe operation for receiving a notification of an information change of a specific EAS from the EES 100. When transmitting the corresponding subscribe request (e.g., a dynamic information subscription request) message to the EES 100, the EEC 52 may also provide user equipment information (UE info: e.g., a UE ID, a UE IP address, a UE CN type, and UE core network capability), app client information (app client ID), and information (EAS ID and address information) on the EAS which is connected to the app client in the user equipment to provide a service. The provided EAS information, the UE information, and the app client information may be used for the EES to select the EAS to be monitored and to select monitoring target information.

At operation 412, the EES 100 may perform an authentication procedure for the dynamic info subscription service of the EEC and the UE based on the information received at operation 410.

At operation 414, the EES 100 may identify whether an EAS information change event can be monitored with respect to the EEC having requested the subscribe or the EAS providing the service to the UE 50, and may request a subscribe operation for an EAS information change event notification for monitoring from the EAS 101. In the embodiment of FIG. 4, it is assumed that the UE accesses the first EAS 101 and is provided with an EMC service.

Further, when the EES 100 transmits the EAS information change event notification subscribe request message to the EAS 101, the corresponding message may include the UE ID of the requested user equipment, EEC ID, and app client ID.

In one example, the EES 100 may not perform a separate subscribe operation, but may monitor the EAS information change through the EAS registration operation (e.g., the EES 100 may provide an EAS registration expiration time to the EAS 101 during an initial EAS registration operation so as to periodically perform the EAS registration with indication of update, and thus can perform monitoring through the EAS registration).

At operation 416, the EES 100 may transmit, to the EEC 52, a dynamic information subscribe response message including the result of the dynamic information subscribe request (e.g., success/failure) and monitoring target EAS information. In this case, the dynamic information subscribe response message may include a subscription ID and notification target EAS information to be transferred.

At operation 418, when the EAS information update occurs, the EAS 101 may transmit an EAS info change event notification to the EES 100. The corresponding notification to be transmitted may include the UE ID of the user equipment having been provided with the service of the EAS 101, the EEC ID, the app client ID, and updated information (e.g., EAS address update, service KPI update, and EAS profile information). In case that the EAS info change event notification message indicates that the EAS is in an unavailable status, the EES 100 may perform an additional operation for instantiation of a new EAS.

At operation 420, the EES 100 may identify whether the EAS received at operation 418 is in an unavailable status due to the excess of an allowable load (e.g., information on the excess of the corresponding allowable load may be provided from a manager server 401. For example, the manager server 401 may provide the EAS ID of the excess of the allowable load). If the EAS is in an unavailable status due to the excess of the allowable load, the EES 100, at operation 422, may perform a new EAS instantiation request operation from the manager server (e.g., lifecycle manager/orchestrator/platform manager server) 401. The corresponding instantiation request message may include information on the target EAS (e.g., an EAS ID and an app client ID) so as to instantiate a new EAS that can perform the same service and function as those of the existing EAS. The instantiation of this operation means an EAS instantiation in the same platform managed by the EES 100 or the same edge hosting environment.

The manager server (e.g., the lifecycle manager, the orchestrator, or the platform manager can perform the instantiation for the EAS) 401 that performs the EAS instantiation operation may complete the instantiation operation at operation 424 with respect to the EAS requested at operation 422, and then may transmit the result of the instantiation to the EES 100 at operation 426.

At operation 426, the EAS 102 being newly instantiated by the manager server 401 may inform that the EAS 102 is ready to provide the service by performing an EAS registration operation with respect to the EES 100 at operation 428. When performing the EAS registration, the new EAS 102 may transfer its own EAS ID, EAS address, and EAS profile information (e.g., a service area, a service KPI, computing resource, and a supportable app client ID) to the EES 100.

At operation 430, the EES 100 may transfer, to the EEC 52, the notification for dynamic information message including information on the new EAS 102 retrieved through operation 428 (e.g., an EAS ID, an address, and EAS profile information) and the EAS info TTL for the corresponding information. In order to inform of updating of the information on the EAS 101 having provided the service to the user equipment, the information may be transferred through mapping onto the EAS ID of the existing EAS or the app client ID to which the existing EAS has provided the service.

At operation 432, the EEC 52 may store or cache the newly transferred EAS information in the memory, and may operate a timer for the time-to-live or lifetime of the corresponding information (e.g., a value provided at operation 430 or a self-configured value). Thereafter, the EAS 102 corresponding to the transferred information may process to transmit an app data traffic occurring in the app client that can provide the service to a cached EAS endpoint address (e.g., usage of the cached EAS address information in response to a DNS query occurring in the app client and performing of routing for the corresponding traffic).

At operation 434, the EEC 52 may complete operation 532 and re-perform the EEC registration operation, so that the EES 100 can connect to and manage the user equipment and the EAS 102 newly instantiated with the information on the EEC 52.

Figure 5:
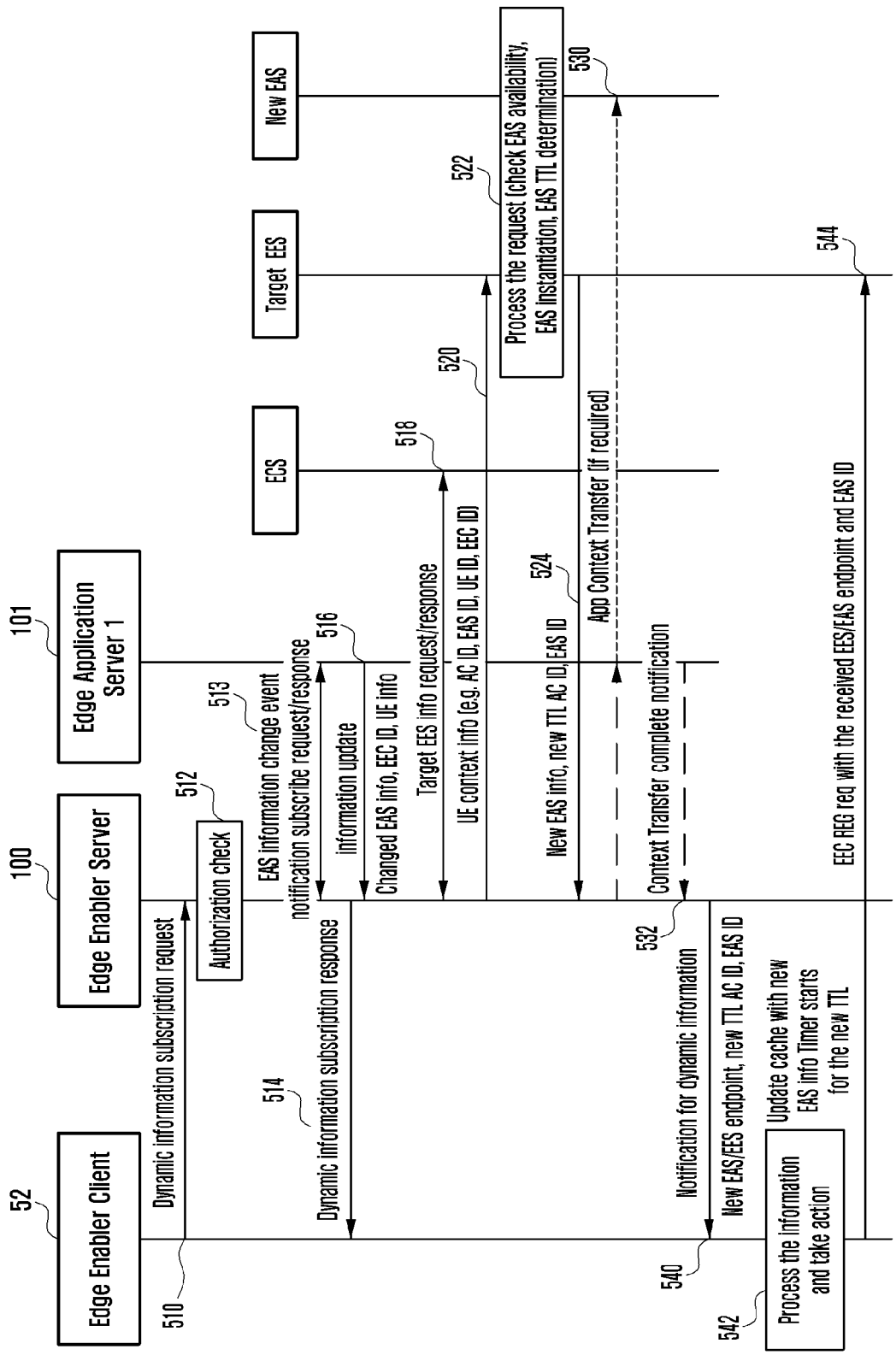
FIG. 5 illustrates a signal flowchart in a MEC network for information update in case that EES of UE is changed according to various embodiments of the disclosure.

FIG. 5 illustrates a signal flowchart in a MEC network for information update in case that EES of UE is changed according to various embodiments of the disclosure.

Prior to the description with reference to FIG. 5, it is assumed that in the devices exemplified in FIG. 5, the user equipment 50 of FIG. 1 as described above is connected to the first edge enabler server 100, and then moves to the second edge enabler server 200.

At operation 510, the EEC 52 may perform a subscribe operation for receiving a notification of an information change of a specific EAS 101 from the first EES 100. When transmitting the corresponding subscribe request (e.g., dynamic information subscription request) message to the first EES 100, the EEC 52 may also provide user equipment information (UE info: e.g., a UE ID, a UE IP address, a UE CN type, and UE core network capability), app client information (an app client ID), and information (EAS ID and address information) on the EAS 101 which is connected to the app client in the user equipment to provide a service. The provided EAS information, the UE information, and the app client information may be used for the first EES 100 to select the EAS to be monitored and to select monitoring target information.

At operation 512, the first EES 100 may perform an authentication procedure for the dynamic info subscription service of the EEC 52 and the UE 50 based on the information received at operation 510.

At operation 513, the first EES 100 may identify whether an EAS information change event can be monitored with respect to the EEC 52 having requested the subscribe or the EAS 101 providing the service to the UE 50, and may request a subscribe operation using an EAS information change event notification request message for monitoring. When transmitting the corresponding EAS information change event notification subscribe request message, the first EES 100 may include the UE ID of the requested user equipment, EEC ID, and app client ID in the message.

In one embodiment, the first EES 100 may not perform a separate subscribe operation, but may monitor the EAS information change through the EAS registration operation (e.g., the first EES 100 may provide an EAS registration expiration time to the EAS 101 during an initial EAS registration operation so as to periodically perform the EAS registration with indication of update, and thus can perform monitoring using the EAS registration message).

At operation 514, the first EES 100 may transmit, to the EEC 52, a dynamic information subscribe response message including the result of the dynamic information subscribe request (e.g., success/failure) and monitoring target EAS information. In this case, the dynamic information subscribe response message may include a subscription ID and notification target EAS information to be transferred.

At operation 516, when the EAS information update occurs, the EAS 101 may transmit an EAS info change event notification message to the first EES 100. The EAS 101 may include the UE ID of the user equipment having been provided with the service of the EAS 101, the EEC ID, the app client ID, and updated information (e.g., EAS address update, service KPI update, and EAS profile information) in the corresponding notification message to be transmitted. In addition, the EAS 101 may inform that the location of the user equipment has escaped the EAS service area (e.g., in case that the EAS has monitored the change of the location of the user equipment or the data network access identifier (DNAI) through continuous interlocking with the 3GPP network, it may be aware of and inform of the monitored change) in the EAS info change event notification message.

At operation 518, the first EES 100 may determine the notification transfer target user equipment based on the information included in the EAS info change event notification message from the EAS 101 at operation 516, and may perform interlocking with the edge configuration server (ECS) 30 to retrieve the information to be transferred to the corresponding user equipment. For example, examples of execution conditions for the first EES 100 to interlock with the ECS 30 are as follows.

(i) In case that the EAS info change event message includes that the EAS is in an unavailable status, and an additional EAS instantiation is not possible in a platform to which the EES 100 and the EAS 101 currently belong, (ii) In case that the EAS info change event message includes information related to mobility of the user equipment (e.g., UE location changed or DNAI changed), or (iii) In case that the first EES 100 detects an event in which the user equipment 50 deviates from the EES service area, or detects the DNAI change just before operation 518.

For this, the first EES 100 or the EAS 101 may detect the location of the user equipment or the occurrence of an UP path management event (e.g., DNAI change) of the user equipment through the interlocking with the 3GPP network, and transfer the changed location of the user equipment and a new target DNAI value to the ECS 30. Accordingly, the ECS 30 may perform selection of the target EES through comparison of the stored service area and connection point of another EES with identified DNAI values. In FIG. 5, it is assumed that the second EES 200 as described above with reference to FIG. 1 is selected as the target EES. Accordingly, the ECS 30 can finally transfer the selected target EES related information (e.g., an ID and an address) to the existing first EES 100.

At operation 520, the first EES 100 may transfer the user equipment related information and edge application server information having used by the user equipment to the target EES 200 based on the target EES information provided from the ECS 30 (a UE ID, an EEC ID, an app client ID, and an EAS ID).

At operation 522, the target EES 200 may select the currently available EAS 201 or may trigger new EAS instantiation based on the information transferred at operation 520.

At operation 524, the target EES 200 may configure and transmit, to the existing EES 100, the EAS information retrieved according to performing of operation 522 and time to live for the corresponding information. If application context relocation is necessary, the first EAS 101 having provided the service to the user equipment 50 may transmit application context information (e.g., information being stored in the EAS 101 device) necessary to guarantee the service continuity of the user equipment 50 through operation 530 to a new EAS (e.g., EAS corresponding to the information provided at operation 524). If the operation 530 is completed, the existing first EAS 101 may inform the first EES 100 of the completion through operation 532.

At operation 540, the first EES 100 may inform a notification for dynamic information message to the EEC 52, and the notification for dynamic information message may include retrieved information of the target EES 200, information (e.g., an ID and an address) of a new EAS 201, an app client ID connectable to the corresponding EAS 201, and EAS info time-to-live. In case of operation 540, if an application context relocation operation between the EASs is necessary, the EES 100 may send to the EEC 52 information of the target EES 200, information (e.g., a target EAS address and an ID) of the target EAS 201, and related target EAS profile information after completion of performing of the corresponding operation (e.g., completion of operations 530 and 532), that is, after the source EAS 101 completes the application context transfer to the target EAS 201 and after receiving a context transfer complete message from the source EAS 101.

At operation 542, the EEC 52 may cache the information in the received notification for dynamic information message in the memory, and may operate a timer for a time-to-live for the corresponding information. Thereafter, the app data traffic occurring in the app client being executed may be transmitted to a cached EAS endpoint address.

At operation 544, the EEC 52 may perform an EEC registration operation in the target EES 200 provided through operation 542. When transmitting the EEC registration request message, the EEC 52 may include the provided EAS ID and address information in the message, and thus the target EES 200 may manage information on the user equipment and the EEC 52, and may identify the information on the EAS 201 that provides the service to the corresponding user equipment.

Figure 6:
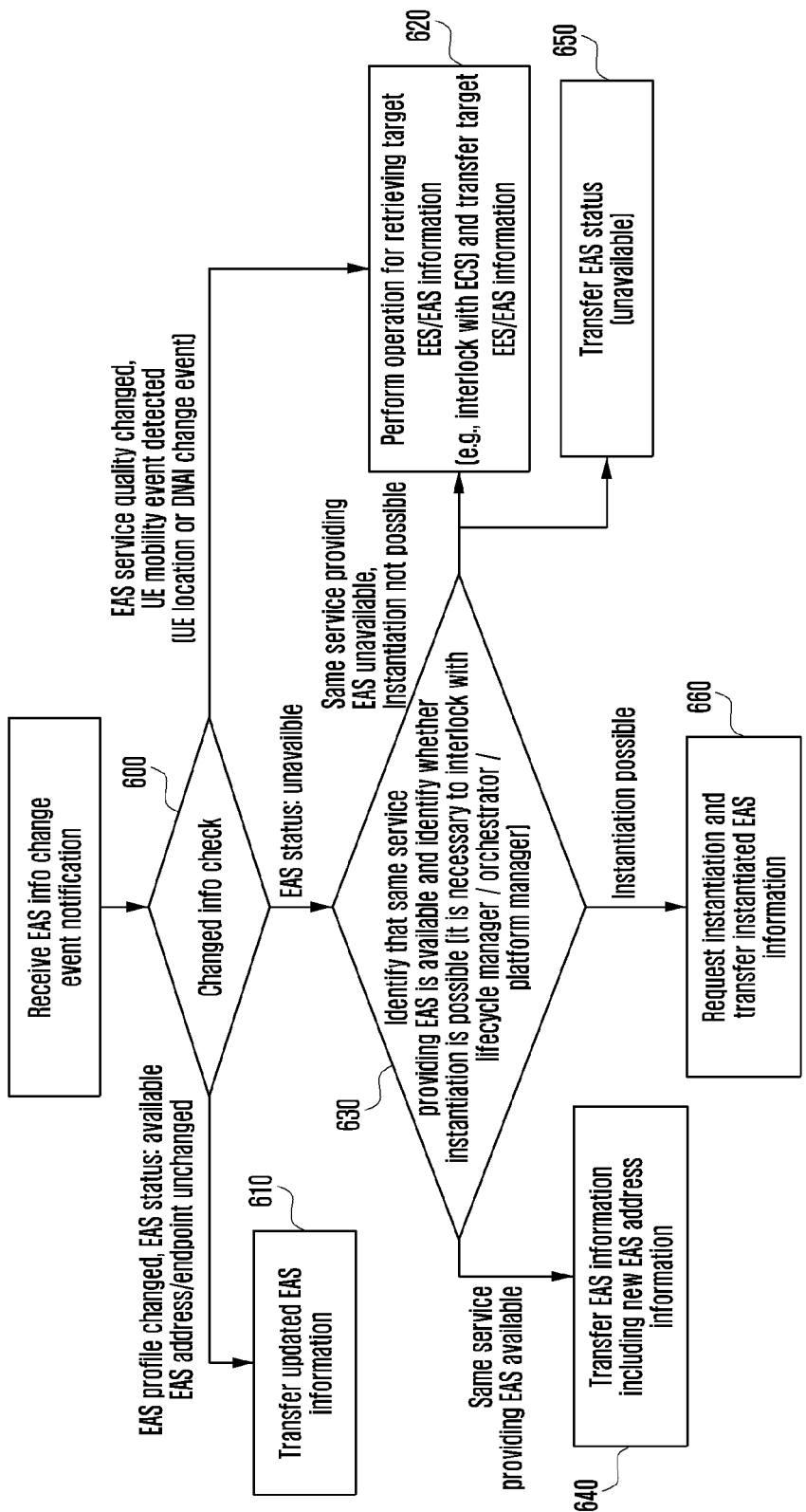
FIG. 6 illustrates a control flowchart in case that an edge enabler server receives an edge enabler application information change event message according to various embodiments of the disclosure.

FIG. 6 illustrates a control flowchart in case that an edge enabler server receives an edge enabler application information change event message according to various embodiments of the disclosure.

In FIG. 6, it is assumed that an edge enabler server receives an edge enabler application information change event message. Further, referring to FIG. 6, explanation will be made on the assumption that the EES is the first EES 100 of FIG. 1. However, in case that an embodiment of the disclosure is applied, other EESs may also perform an operation of FIG. 6.

Referring to FIG. 6, the EES 100 may check a received EAS information change event message at operation 600. If the existing EAS is continuously available as the result of the checking, but a change of partial information (e.g., EAS address information, a service area, and service KPI) in an EAS profile occurs, the EES 100 may proceed with operation 610 and may transfer updated EAS information. In this case, the operation of FIG. 3A (e.g., information transfer in a changed EAS profile) as described above may be performed.

Further, the EES 100 may identify that the existing EAS is in an unavailable EAS status as the result of checking the received EAS information change event message at operation 600. In this case, the EES 100 may proceed with operation 630. At operation 630, the EES 100 may identify that the EAS providing the same service is available. Accordingly, the case may be re-classified into the following cases.

Case 1 (e.g., operation 640): The EAS that can provide the same service as that of the existing EAS may exist in the same platform or edge hosting environment. In this case, as described above with reference to FIG. 3B, a control to transfer an EAS profile including available EAS ID and address information to user equipment may be performed.

Case 2: In case that there is no EAS that can provide the same service as that of the existing EAS, the case may be re-classified into the following three cases.

Case 2-1: A case where it is possible to perform instantiation in the same EES edge hosting environment or edge platform structure may exist. In this case, the operation may proceed with operation 660. At operation 660, the EES 100 may request to perform instantiation, and may transfer instantiated EAS information to the user equipment. This operation may correspond to the above-described example of FIG. 4.

Case 2-2: A case where it is not possible to perform instantiation in the same EES (100) edge hosting environment or edge platform structure may exist. In this case where it is not possible to perform instantiation, the EES 100 may proceed with operation 650, and as described above with reference to FIG. 3B, the user equipment may be induced to perform new EAS discovery or service provisioning by informing the user equipment that the EAS status is changed to an unavailable status.

Case 2-3: The EES 100 may detect that the user equipment deviates from an EAS service area (e.g., detecting the movement of the user equipment, the change according to variation of the EAS service area, or the DNAI change). In this case, the EES 100 may proceed with operation 620, and may retrieve and transmit target EES/target EAS information to the user equipment. This operation may correspond to the above-described operation corresponding to FIG. 5. That is, it may be possible to retrieve EAS information managed by another EES located in a different edge hosting environment or platform and to transfer the retrieved EAS related information to the user equipment.

In the detailed description of the disclosure, the embodiments in which the edge enabler server transmits the related update to the user equipment (EEC) according to the change of the information related to the edge application server have been described. However, an operation in which the edge configuration server transmits the related update to the user equipment (EEC) according to the information change in the edge enabler server profile can also be included in the scope of the disclosure.

Although preferred embodiments have been described in the detailed description of the disclosure, various changes and modifications are possible to the extent that does not get out of the scope of the disclosure. Accordingly, the scope of the disclosure should not be limited to the above-described embodiments, but should be defined by not only the claims but equivalents thereof.

Figure 7:
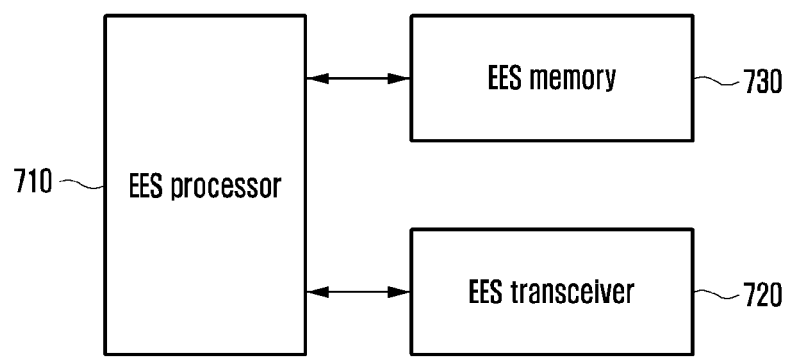
FIG. 7 illustrates a structure of EES according to various embodiments of the disclosure.

FIG. 7 illustrates a structure of EES according to various embodiments of the disclosure.

Referring to FIG. 7, an edge enabler server (EES) may include an EES processor 710, an EES transceiver 720, and an EES memory 730.

In case of a source edge enabler server 100, the EES processor 710 may control the operation of the source edge enabler server 100, and in case of a target edge application server 200, the EES processor 710 may control the operation of the target edge enabler server 200. In the signal flowchart of FIG. 2, in which there is no distinction between a source edge application server and a target application server, and in the signal flowchart of FIGS. 3A and 3B, the operation performed by the edge enabler server 100 or 200 may be controlled by the EES processor 710.

Further, in case of operating as the source edge enabler server 100, the EES processor 710 may control the operation of the edge enabler server 100 in the signal flowchart of FIG. 4, and may control the operation of the edge enabler server 100 in the signal flowchart of FIG. 5. That is, the EES processor 710 may control all operations of the edge enabler server 100 as described in the disclosure.

In addition, the EES processor 710 may control the operation of the edge enabler server 100 or 200 in the control flowchart of FIG. 6.

The EES transceiver 720 may include a network interface. In transmitting data and/or signal and/or message to a specific network, the network interface may perform a conversion function in a format promised with the corresponding network. The EES transceiver 720 may communicate with edge application servers 101, 102 or 210 through edge hosting environments 110 and 210, may communicate with an edge data network configuration server 30, and may communicate with UE 50 through a 3GPP core network. For example, the EES transceiver 720 may transmit a specific message (or signal) to the edge application servers 101, 102 or 210 and/or may receive a specific message (or signal) from the edge application servers 101, 102 or 210.

The EES memory 730 may store therein various kinds of information as described above with reference to FIGS. 1 to 6 of the disclosure. For example, the EES memory 730 may store information of EAS, updated information of the EAS, and information of the UE.

Figure 8:
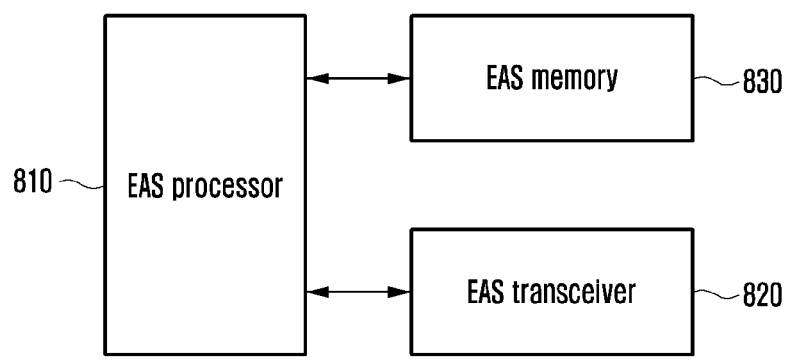
FIG. 8 illustrates a structure of EAS according to various embodiments of the disclosure.

FIG. 8 illustrates a structure of EAS according to various embodiments of the disclosure.

Referring to FIG. 8, an edge application server (EAS) 101, 102, or 201 may include an EAS processor 810, an EAS transceiver 820, and an EAS memory 830.

The EAS processor 810 may perform control operations in the edge application server. That is, the EAS processor 810 may control the operation of the edge application server as described above with reference to FIGS. 1 to 6.

The EAS transceiver 820 may include a network interface. The EAS transceiver 820 may communicate with edge enabler servers 100 or 200 through edge hosting environments 110 and 210, and may communicate with UE 50 through a 3GPP core network.

The EAS memory 830 may store therein various kinds of information as described above with reference to FIGS. 1 to 6 of the disclosure. For example, the EAS memory 830 may store information of EAS, updated information of the EAS, and information of the UE.

Figure 9:
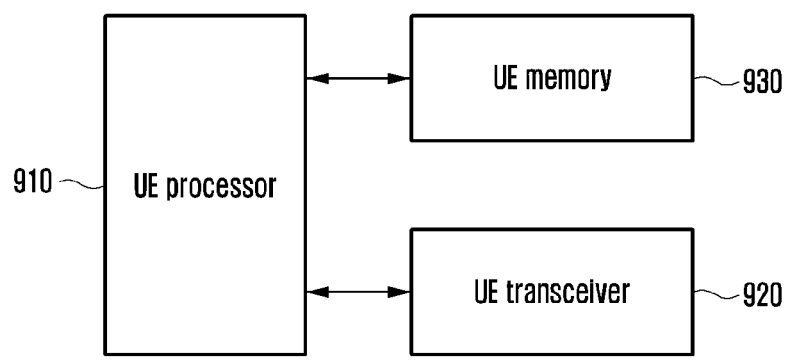
FIG. 9 illustrates a structure of UE according to various embodiments of the disclosure.

FIG. 9 illustrates a structure of UE according to various embodiments of the disclosure.

Referring to FIG. 9, user equipment (UE) 50 may include a UE processor 910, a UE transceiver 920, and a UE memory 930.

The application client 53 exemplified in FIG. 1 may be mounted in the UE processor 910. Further, the MT 51 exemplified in FIG. 1 may be implemented by a separate processor, such as a communication processor. However, in FIG. 9, all such processors are collectively called the UE processor 910. Accordingly, an edge application client 52 may also be mounted in the UE processor 910, and such a form is exemplified in FIG. 9.

The UE transceiver 920 may take charge of transmission and reception of signal/message/data in the air in accordance with the rules of a mobile communication system. For example, the UE transceiver 920 may convert the signal/message/data to be transmitted into an analog signal, up-convert the converted analog signal into a set band, and power-amplify and transmit the up-converted signal through an antenna (not illustrated in FIG. 9). Further, the UE transceiver 920 may receive the signal/message/data in the set band, low-noise-amplify the received signal/message/data, down-convert the band into a band capable of being processed by the UE processor 910, and then convert the down-converted signal into a digital signal to be output to the UE processor 910.

The UE memory 930 may include an area for temporary buffering of the signal/message/data to be transmitted, an area for temporary buffering of the received signal/message/data, and/or an area for storing various kinds of data as described above with reference to FIGS. 1 to 6.

Further, the UE 50 may have more additional configurations in addition to the configurations exemplified in FIG. 9. For example, the UE 50 may include at least one or two or more of a display for a user interface, a touch screen, a speaker, keys, and various kinds of sensors.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for continuously providing an edge computing service to user equipment (UE) by an edge enabler server (EES) of a mobile edge computing (MEC) system, the method comprising:
   receiving, from a source edge application server (EAS), update information including UE information and source EAS information, wherein the source EAS provides the edge computing service to the UE;
   retrieving, from an edge configuration server (ECS), target EES information based on the update information;
   transmitting, to a target EES, the UE information and the EAS information based on the target EES information;
   receiving, from the target EES, target EAS information; and
   transferring, to the source EAS, the target EAS information,
   wherein the UE information includes a UE identifier and at least one of UE location information or a target data network access identifier (DNAI),
   wherein the EAS information includes EAS identification information and EAS discovery filter information including an EAS profile, and
   wherein a target EAS is triggered to be instantiated by the target EES.

2. The method of claim 1, further comprising sending, to the UE, information indicating a completion of application context relocation in case that the application context relocation between the EASs is completed.

3. The method of claim 2, wherein the information comprises target EES information, target EAS information, and target EAS profile information.

4. The method of claim 3, wherein the target EAS information comprises a target EAS address and a target EAS identifier.

5. The method of claim 3, wherein the target EAS information is mapped onto a time to live (TTL) of the target EAS information, and is provided to the UE through an EAS discovery response message.

6. The method of claim 1, wherein retrieving the target EES information comprises:
   transmitting UE context information to the ECS; and
   retrieving, from the ECS, the target EAS information and a time to live (TTL) of the target EAS information.

7. The method of claim 6, wherein the UE context information includes an application client (AC) identifier, a source EAS identifier, a UE identifier, and an EES identifier.

8. An apparatus for continuously providing an edge computing service to user equipment (UE) of a mobile edge computing (MEC) system, the apparatus comprising:
   memory;
   a processor; and
   a transceiver operably connected to the memory and the processor, the transceiver configured to:
     receive, from a source edge application server (EAS), update information including UE information and source EAS information, wherein the source EAS provides the edge computing service to the UE,
     retrieve, from an edge configuration server (ECS), target EES information based on the update information,
     transmit, to a target EES, the UE information and the EAS information based on the target EES information,
     receive, from the target EES, target EAS information, and
     transfer, to the source EAS, the target EAS information,
   wherein the UE information includes a UE identifier and at least one of UE location information or a target data network access identifier (DNAI),
   wherein the EAS information includes EAS identification information and EAS discovery filter information including an EAS profile, and
   wherein a target EAS is triggered to be instantiated by the target EES.

9. The apparatus of claim 8, wherein the transceiver is further configured to send, to the UE, information indicating a completion of application context relocation in case that the application context relocation between the EASs is completed.

10. The apparatus of claim 9, wherein the information comprises target EES information, target EAS information, and target EAS profile information.

11. The apparatus of claim 10, wherein the target EAS information comprises a target EAS address and a target EAS identifier.

12. The apparatus of claim 10, wherein the target EAS information is mapped onto a time to live (TTL) of the target EAS information, and is provided to the UE through an EAS discovery response message.

13. The apparatus of claim 8, wherein the transceiver is further configured to:
   transmit, to the ECS, UE context information including an application client (AC) identifier, a source EAS identifier, a UE identifier, and an EES identifier; and retrieve, from the ECS, the target EAS information and a time to live (TTL) of the target EAS information.

* * * * *